(12) United States Patent
Criswell

(10) Patent No.: US 8,348,559 B1
(45) Date of Patent: Jan. 8, 2013

(54) CENTERING ADAPTOR FOR FLAT-BLADED DRILL BITS

(76) Inventor: Richard R. Criswell, Las Vegas, NV (US)

( * ) Notice: Subject to any disclaimer, the term of this patent is extended or adjusted under 35 U.S.C. 154(b) by 558 days.

(21) Appl. No.: 12/589,185

(22) Filed: Oct. 20, 2009

Related U.S. Application Data

(60) Provisional application No. 61/196,596, filed on Oct. 20, 2008.

(51) Int. Cl.
*B23B 49/00* (2006.01)

(52) U.S. Cl. .................. 408/82; 408/239 R; 279/907

(58) Field of Classification Search ............. 408/79–82, 408/187, 239 R; 279/907; *B23B 49/00*
See application file for complete search history.

(56) References Cited

U.S. PATENT DOCUMENTS

| | | | | | |
|---|---|---|---|---|---|
| 413,316 | A | * | 10/1889 | Dobson | 408/201 |
| 676,669 | A | * | 6/1901 | Wack | 408/201 |
| 967,789 | A | * | 8/1910 | Le Baron | 408/201 |
| 2,226,226 | A | * | 12/1940 | Hedin | 408/201 |
| 3,630,632 | A | * | 12/1971 | Holleman | 408/82 |
| 4,019,827 | A | * | 4/1977 | Christianson et al. | 408/202 |
| 4,043,698 | A | * | 8/1977 | Chelberg | 408/201 |
| 4,289,432 | A | * | 9/1981 | Elkins et al. | 408/201 |
| 4,512,691 | A | * | 4/1985 | Dicke | 408/201 |
| 4,544,308 | A | * | 10/1985 | Westberg | 408/82 |
| 5,388,933 | A | * | 2/1995 | Dunbar | 408/72 B |
| 6,048,141 | A | * | 4/2000 | Freeman | 408/201 |
| 6,059,493 | A | * | 5/2000 | Kirn et al. | 408/226 |

FOREIGN PATENT DOCUMENTS

GB 2359774 A * 9/2001

* cited by examiner

*Primary Examiner* — Eric A Gates

(74) *Attorney, Agent, or Firm* — Allen A. Dicke, Jr.

(57) ABSTRACT

The centering adaptor is configured to receive a spade type drill bit. The body of the adaptor has three centering arms to engage in a previously drilled smaller hole so that the spade type drill bit is guided along the same centerline to re-drill the hole to a larger diameter.

20 Claims, 8 Drawing Sheets

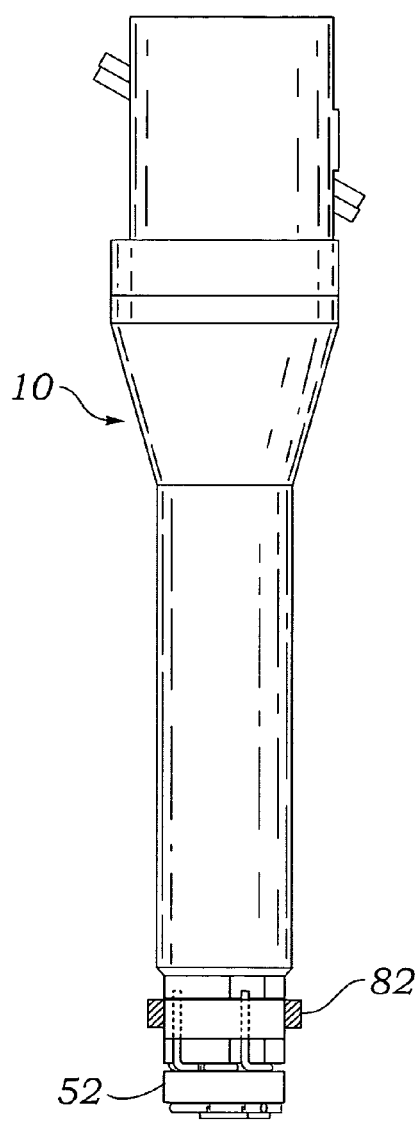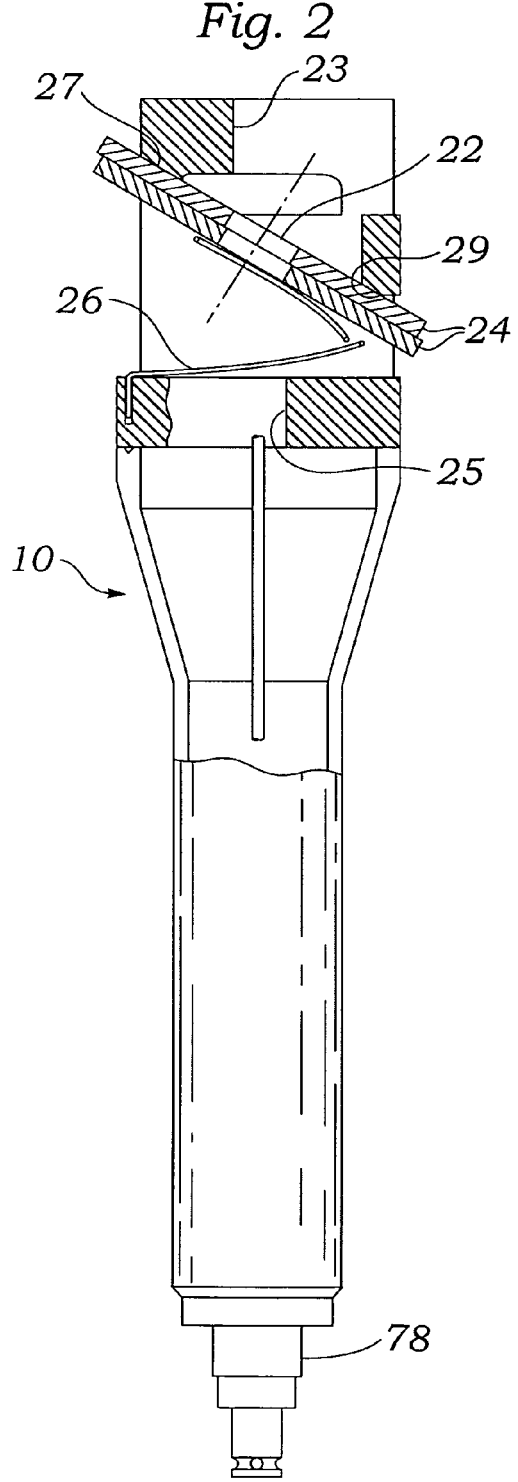

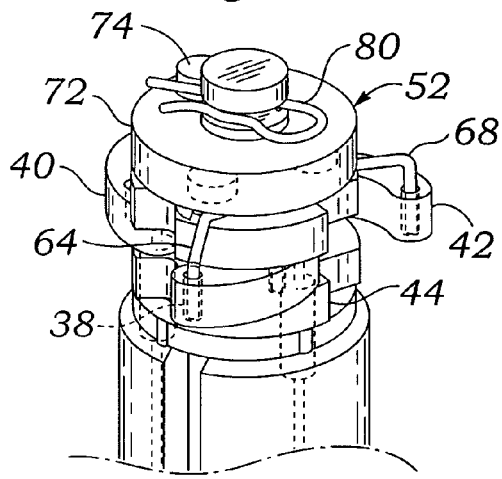
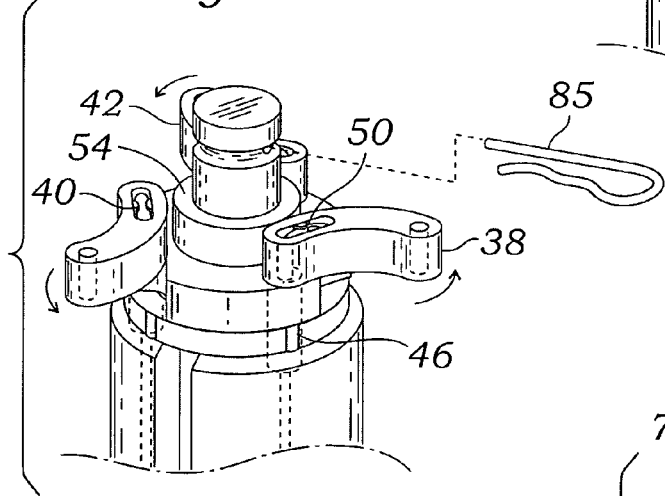
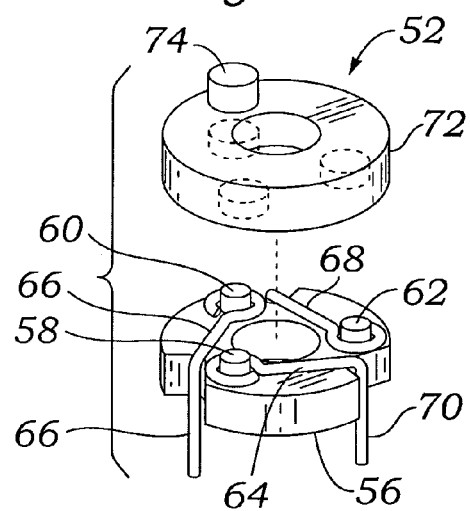

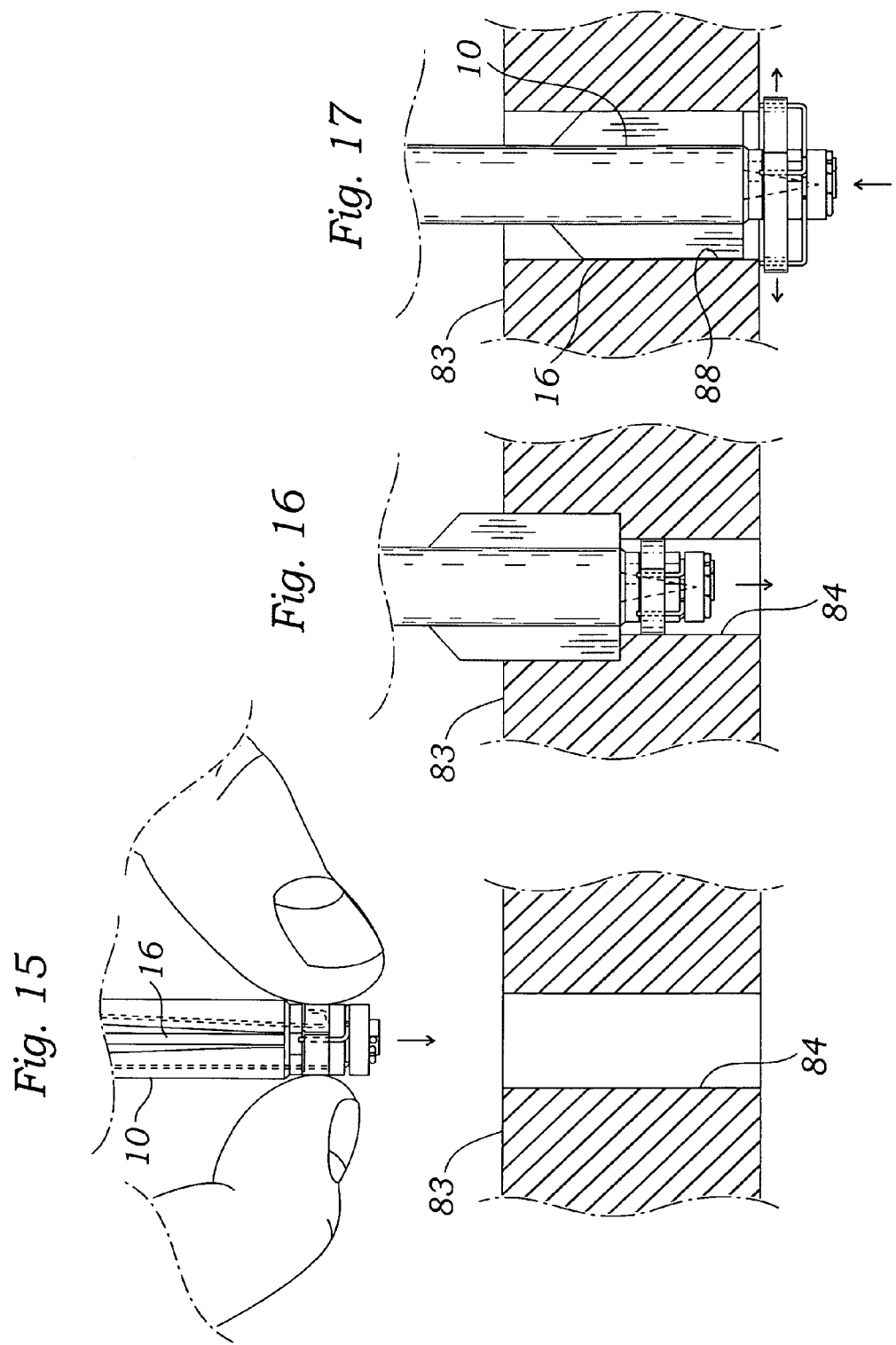

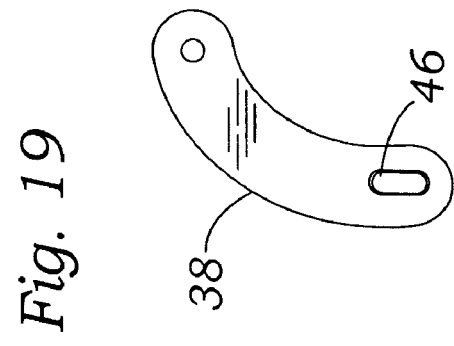
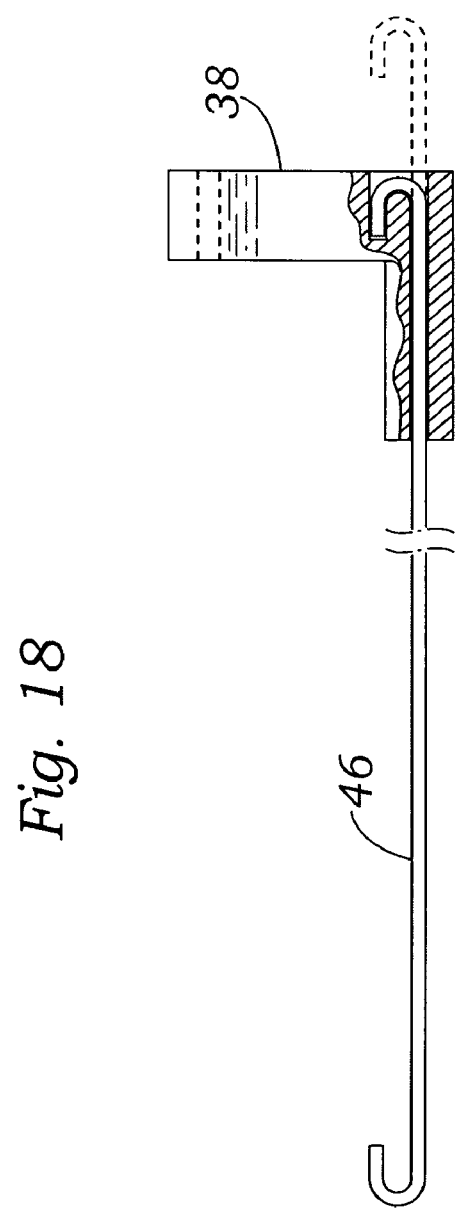

US 8,348,559 B1

CENTERING ADAPTOR FOR FLAT-BLADED DRILL BITS

CROSS REFERENCE

This application relies for priority upon provisional application Ser. No. 61/196,596, filed Oct. 20, 2008, the entire disclosure which is incorporated herein by this reference.

BACKGROUND

When a hole is drilled in wood by any type of drill, a cylindrical hole is created. It sometimes occurs that the hole which has been drilled is undersized and re-drilling to a larger diameter is desired. Spiral wood bits rely upon a centering screw. Flat-bladed drill bits rely upon a center point. Neither of these common types of wood bits can be utilized for enlarging the previously drilled undersized hole, because they rely upon a centering structure on the bit to initially guide the bit.

Holes of larger size are usually bored with a flat-bladed drill bit. These are popularly called power bits, speedbor, spade bit, and paddle bit. When these types of drill bits are used, the center point of the bit is positioned on the center point of the hole to be bored. The bit is rotated and the bit is fed into the work. As the hole is started, the point maintains bit guidance. After a depth of about one-half the bit diameter has been reached, the bit blade sides alone are capable of maintaining further directional guidance of the bit. These flat bits have achieved wide acceptance due to several advantages over twist drills. Some of the advantages are wide availability, particularly in larger sizes. Flat-bladed drill bits can readily be resharpened with common hand files or grinding wheels. Furthermore, they are relatively inexpensive because of their simplicity. Flat-bladed drill bits are currently mass produced in sizes to drill holes up to one and one-half inch and 40 millimeters As pointed out above, one shortcoming of the bit is its inability to enlarge existing holes due to the absence of material for engagement by the point of the bit. There is no material to act as centering structure for the second and subsequent bits. There is need for a device which permits flat-bladed drill bits to easily and accurately enlarge existing holes.

SUMMARY OF THE INVENTION

In order to aid in the understanding of this invention it can be stated in essentially summary form that it is directed to a centering adapter for flat-bladed drill bit. The centering adaptor receives and engages upon a bit having a cutting diameter which is the diameter of the newly desired drilled hole. The centering adaptor has centering arms positioned in front of the new flat-bladed drill bit to engage against the cylindrical walls of the previously drilled hole to guide the new bit so that it rotates in the same axis as the previously drilled cylindrical hole so that as the bit and the adaptor are advanced, the new bit engages the workpiece and drills the larger hole on the same axis as the previously drilled hole.

It is a purpose and advantage of this invention to provide a centering adaptor for flat-bladed drill bits such that the drill bit is guided with respect to an existing smaller hole acting as a pilot hole so as to drill the hole to a larger diameter.

It is another purpose and advantage of this invention to provide a centering adaptor for flat-bladed drill bits which has guide arms thereon which can be retracted from their maximum repose diameter in order to be installed into a previously drilled hole so that the adaptor is positioned on the axis of the previously drilled hole. A flat-bladed drill bit of larger size is secured in the adaptor and when the adaptor and bit are rotated and advanced, a new, larger hole is drilled on the axis of the previous hole.

It is another purpose and advantage of this invention to provide a centering adaptor for flat-bladed drill bits which is economic of construction, durable and easy to use so that it can be easily employed to drill larger holes where smaller holes have existed.

It is another purpose and advantage of this invention to provide a centering adaptor for flat-bladed drill bits which has guide arms which are retracted to engage in the previously drilled hole in order to center the centering adaptor in the previously drilled hole.

It is a further purpose and advantage of this invention to provide a centering adaptor for flat-bladed drill bits wherein the adaptor has spring expanded arms for engaging in the previously drilled hole, and the spring expanded arms can be retracted in over a size range so that the adaptor is useful over a range of previously drilled holes.

It is a further purpose and advantage of this invention to provide an adaptor which can be provided in two sizes, the smaller being suitable for engaging previously drilled holes of approximately one-half inch to $13/16$-inch diameter and the larger being configured to engage in previously drilled holes in the range of approximately $7/8$-inch through one and $7/16$-inch diameter.

Other purposes and advantages of this invention will become apparent from a study of the following portion of the specification, the claims, and the attached drawings.

BRIEF DESCRIPTION OF THE DRAWINGS

FIG. 1 is a side elevational view of the centering adaptor for flat-bladed drill bits in accordance with this invention.

FIG. 2 is an enlarged side view of the body of the adaptor with parts broken away to show a transverse section through the top of the adaptor

FIG. 12 is an isometric view of the tip of the centering adaptor, showing the arm assembly in plate.

FIG. 13 an exploded view of the equalizer subassembly which is shown assembled in FIG. 14.

FIG. 14 is an isometric view of the assembled tip of the centering adaptor.

FIG. 15 shows a flat-bladed drill bit inserted into the centering adaptor of this invention, with parts broken away and the drill being shown approaching the workpiece with a previously drilled pilot hole.

FIG. 16 is a similar view, showing the drill as drilling part way through the workpiece.

FIG. 17 is a similar view, showing the hole drilled completely through the workpiece and the drill and adaptor about to be withdrawn.

FIG. 18 is a side view of the arm assembly, with parts broken away and parts taken in section.

FIG. 19 is a right end view of the arm assembly shown in FIG. 18.

DESCRIPTION OF THE PREFERRED EMBODIMENT

Figure 3:
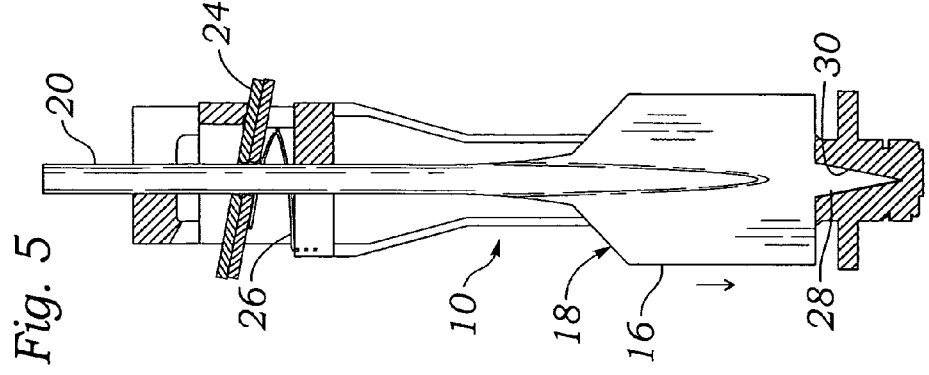
FIG. 3 is a view of a flat-bladed drill bit being inserted into the centering adaptor of this invention, showing the centering adaptor in transverse cross section.
Figure 4:
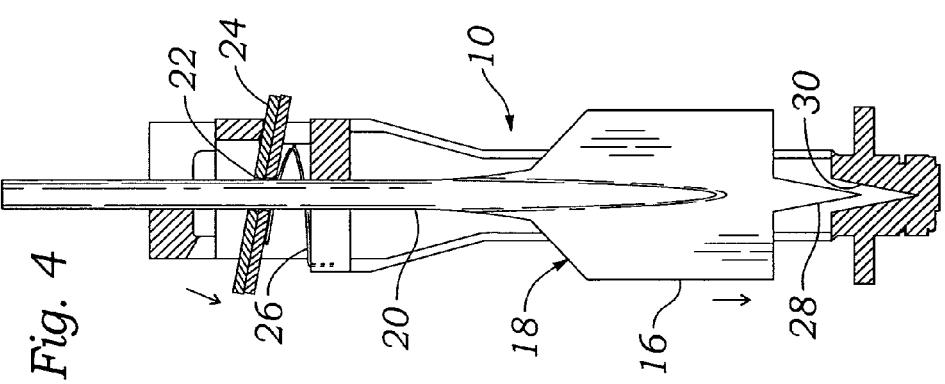
FIG. 4 is a similar view, showing the flat-bladed drill bit in axial alignment within the centering adaptor and being moved downward into assembled position.

The centering adaptor for spade type drill bits in accordance with this invention is generally indicated at 10 in FIGS. 1, 2, 3, 4, 5, 6, and 7. The body 12 of the centering adaptor 10 is the first subassembly. It is a generally cylindrical tube formed of a plurality of polymer parts permanently attached. It is formed with a slot 14 through the walls intermediate the ends. This slot is sufficiently wide overall to accept the thickness of the spade 16 of drill bit 18 and the upper end of the slot is sufficiently wide to accept the shank 20 of the drill bit 18. As the shank is introduced into the body 12 and moved upwardly, see FIGS. 3, 4, and 5, it passes through the holes 22 of identical lock plates 24. The lock plates are urged upwardly by means of a spring 26. The lock plates are constrained in their own pocket in the upper portion of the body. When the drill bit is swung into the body, from the position of FIG. 3 to the position of FIG. 4, the shank contacts the walls of the body above and below the lock plates at 23 and 25, thus obtaining substantial coaxial shank and body alignment. Simultaneously, the lock plates pivot away from their stop 27 about their fulcrum 29.

Figure 5:
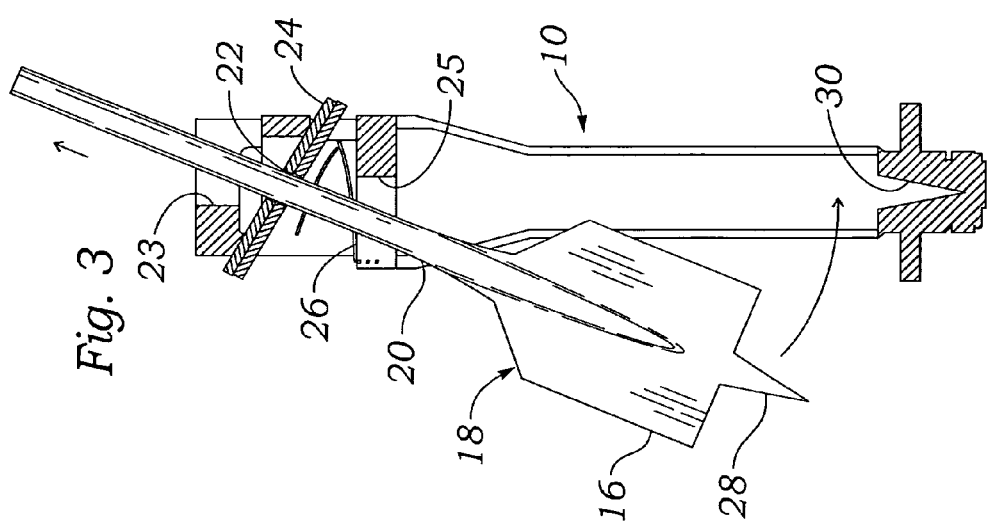
FIG. 5 is a similar view, showing the flat-bladed drill bit fully inserted and locked into the centering adaptor.

The drill bit is pushed downwardly in the body until tip 28 engages in the socket 30 as shown in FIG. 5. In this position, the lock plates are off of their stop and the edges of the holes 22 engage on the shank 20 to prevent the drill bit from moving upwardly in the body.

To release the drill bit, the lock plates 24 are manually moved downward to release the aforementioned engagement on the shank. In this released position, the drill bit can be raised and then swung out to the position of FIG. 3. The drill bit can then be removed from the centering adaptor.

Figure 6:
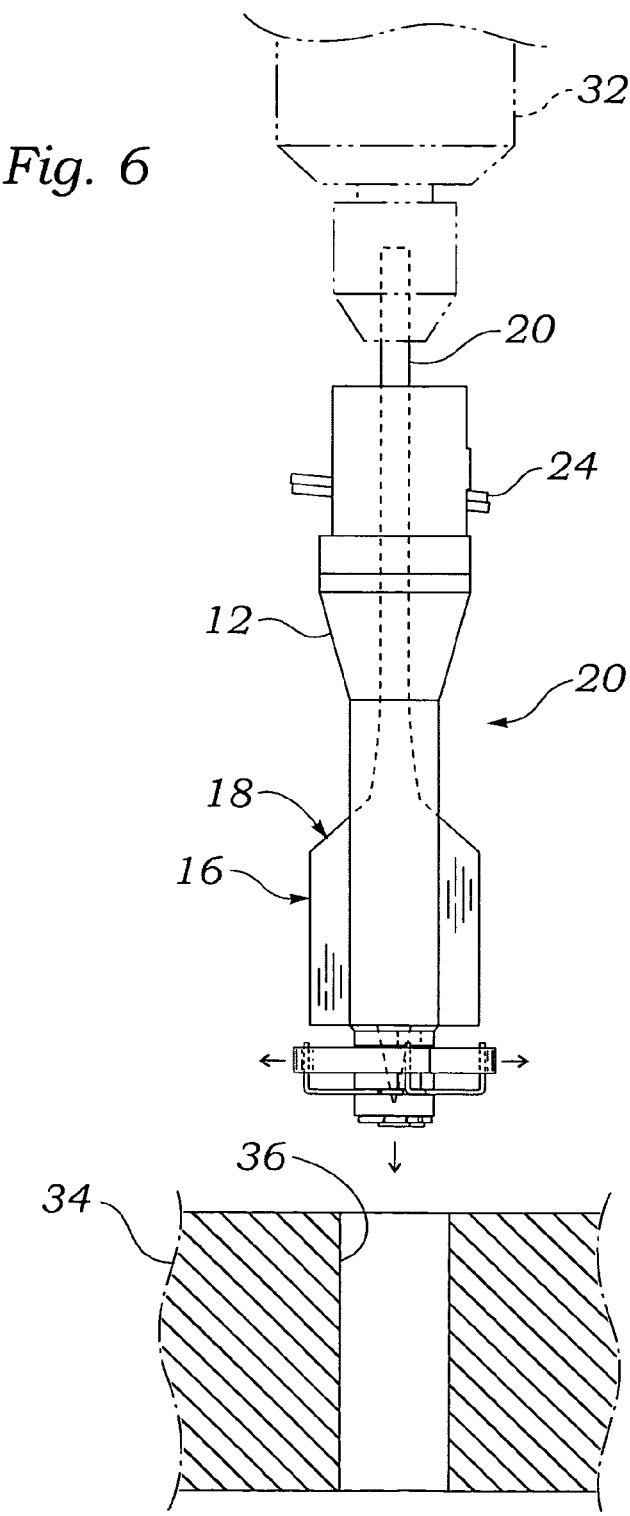
FIG. 6 is a side elevational view of the centering adaptor with flat-bladed drill bit installed therein mounted in a drill driver shown in dashed lines and ready to insert into a previously drilled pilot hole in a workpiece.
Figure 7:
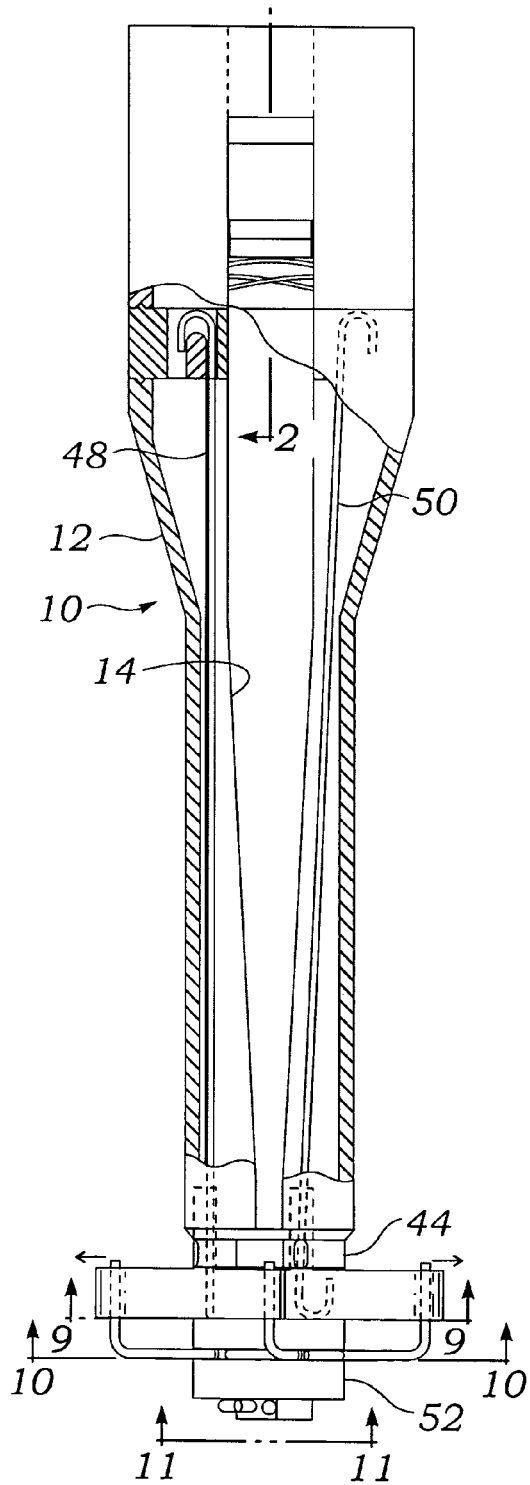
FIG. 7 is side elevational view, with parts broken away and taken in centerline section of the centering adaptor for flat-bladed drill bits of this invention.

When the drill bit is installed in the adaptor, it is ready to use. FIG. 6 illustrates that the shank 20 of the drill bit 18 can be installed in a drill driver 32, shown in dashed lines in FIG. 6. The drill driver 32 can be a portable or a stationary device. It is moved toward a workpiece 34 which contains an undersized pilot hole 36. The drilling process will be described below.

In order for the larger size bit 18 to be guided concentrically into the previously drilled pilot hole 84 in the workpiece 83, the adaptor 10 must be guided with respect to the previously drilled pilot hole. To accomplish this, three arms 38, 40, 42 are pivoted on the nose of the centering adaptor 10. They are identical, pivoted on the same radius and swing out equal angles, so that the arms, when engaged in a hole, will center the centering adaptor 10 in the pilot hole. These arms are best seen in FIGS. 9, 10, 12 and 14.

Figure 8:
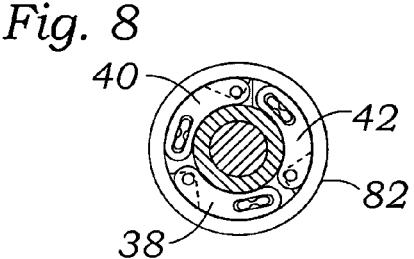
FIG. 8 is a view generally along line 9-9 of FIG. 7 showing the arms closed and the keeper ring 82 in place.
Figure 9:
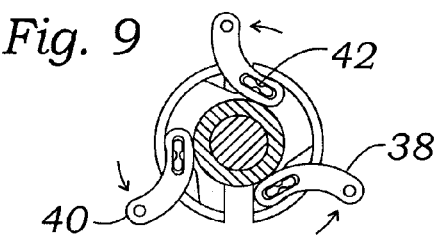
FIG. 9 is a view generally along line 9-9 of FIG. 7 showing the keeper ring off.
Figure 10:
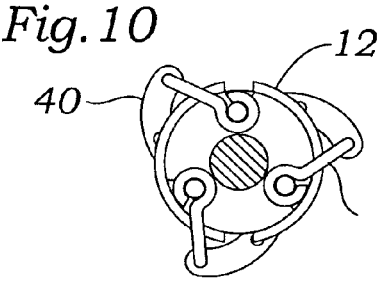
FIG. 10 is a section taken generally along line 10-10 of FIG. 7 showing the equalizer in place.
Figure 11:
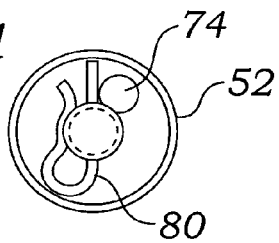
FIG. 11 is a tip end view of the centering adaptor as seen generally along line 11-11 of FIG. 7.
Figure 21:
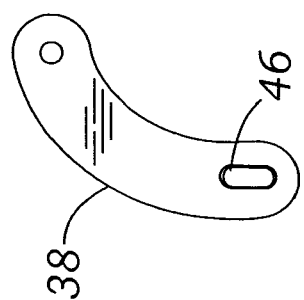
Figure 20:
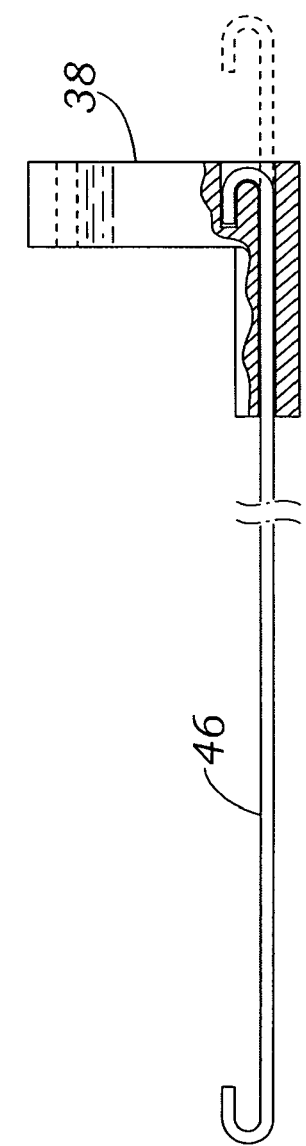

FIGS. 18 and 19 show arm 38 and torsion bar 46 assembled into the second subassembly. FIG. 12 shows torsion bar 46, one of three identical torsion bars 46, 48, and 50. At the tip end, they pass through their respective arms and are hooked and staked therein to form a permanent subassembly, FIG. 18. The arm/torsion bar assemblies have their torsion bars inserted into the holes in the body seen in FIGS. 7, 9 and 12 and are hooked into suitable recesses in the body 12, see FIG. 7. In this manner one end is torsionally fixed to the arms and the other end is fixed to the body, allowing torsional flexing along the bar's length to function as a spring. At this point the arms are essentially wide open, as seen in FIGS. 9 and 12, about 120 degrees from fully closed. They are then collectively rotated to the closed position, torquing the torsion bars fully. The keeper ring 82 is then installed, see FIG. 8, to aid in installation of the equalizer assembly 52 and retaining pin 80. The keeper ring 82 is removed as the last step of assembly. The keeper ring 82 will accompany the unit as an accessory for handling during cleaning to prevent the arms from reopening fully, in which case they can fall out of the body.

The torsion bars are hooked into the arms, as shown in FIGS. 12, 18 and 19 so as to apply torque to the arms around their pivot axes. The arms are resiliently urged by the torsion bars to swing outwardly to increase the radius of the end of the arms with respect to the axis of the body.

It is required that the arms 38, 40, and 42 each retract identically in order to maintain absolute circularity and relative concentricity with the body axial centerline. This is accomplished automatically over the range of retraction by means of equalizing assembly 52 which is rotatably mounted on the body and rests on shoulder 54. The equalizer assembly 52 is shown assembled in FIG. 14 and shown in exploded view in FIG. 13. The equalizer assembly 52 comprises an equalizing collar 56 which has three integral posts 58, 60, and 62 which respectively carry equalizing links 64, 66, and 68. As is best seen in FIG. 13, these equalizing links each have a circular loop on the upper inner end which rotatably engages upon its corresponding post. They each have a downwardly extending tang 70 which respectively engage in holes in the outer ends of arms 38, 40, and 42, as shown in FIG. 14.

The equalizing arms are held on their respective posts by means of cap. The cap has recesses therein to accept the upper ends of the posts. The equalizing levers are freely rotatable on their posts but are constrained in position against the top of equalizing collar 48 by means of the cap. With the ends of the equalizing levers in the three arms, the equalizer oscillates about journal 78, to assure the aforementioned circularity and concentricity of the arms.

The upper surface of cap 72 has a stop post 74 thereon. The stop pin 80, see FIG. 14, engages against the retaining stop post 74 when the arms reach their maximum design diameter, shown in FIG. 14. By this structure the arms are urged outwardly equally to the maximum design diameter, shown in FIG. 14 and retained assembled to the body.

Three torsion bars are disclosed, each driving one of the arms outward. The positioning of the arms must be sufficiently strong so that axial centering is maintained in normal practice. After the beginning of rotation, centrifugal force aids in extending the arms. Three torsion bars are disclosed, however, since the equalizer assembly assures that the three arms are equally extended, one or two torsion bars are optional.

FIGS. 15, 16, and 17 show the manner in which the adaptor is brought to the workpiece. A workpiece 83 has a previously drilled pilot hole 84 therein. Usually the pilot hole extends all the way through the workpiece. The pilot hole 84 is undersized. A new bit with a spade 16 of the desired diameter is chosen and installed in the adaptor of this invention. The shank of the drill is installed in the drill driver and the adaptor is brought to the workpiece as shown in FIG. 15. While holding the arms closed, the arms and tip of the adaptor are inserted into the pilot hole. The arms are manually released and drilling commences.

As an alternate method of pilot hole entry, while the drill is rotating, it is brought to the hole 84. The nose of the adaptor fits into the hole but the arms extend out to their full diameter. Rotation of the adapted bit while pressing on the face of the workpiece with the equalized arms of the adaptor causes the arms to retract inward about their pivots, against the spring force of the torsion bars. This inward force is occasioned by the engagement of the arms on the face of the workpiece and is sufficient to overcome spring force and centrifugal force.

Once the arms have been contracted sufficiently, they are entered into the pilot hole 84, centering the adaptor and bit with respect to the pilot hole. Advance of bit causes cutting of the new hole diameter on the same axis as the old. Once the spade bit has entered the new hole 88 to a sufficient depth, the new bit is guided by the walls of the hole it just cut. Usually the hole is cut all the way through. Before the blade of the bit reaches the far side of the workpiece, the arms again swing out, unrestrained by the pilot hole, see FIG. 17. When drilling is complete, the drill and adaptor can be withdrawn from the hole because continued rotation of the adaptor when the equalizer arms are engaged against the back face of the workpiece causes retraction of the arms to permit withdrawal of the bit, as shown in FIG. 17.

The arms, their mounting structure, their spring driving structure, and their equalizing assembly must all be configured to enter into the smallest hole for which the device is intended. It is necessary to design the adaptor in two different sizes. The smaller size can be configured so that it can engage into a pilot hole having a diameter of ½ inch through 13/16 of an inch. In the larger size, the device can be configured to engage in the pilot hole from ⅞ inch through one and 7/16 inch. In this way, only two sizes can achieve the usual range of sizes in which its need is anticipated. Structurally speaking, the embodiment can be constructed with extensive use of synthetic polymer composition material to permit economy of material and with sonic welding creates a permanent structural assembly. For heavier duty structure, some or all of the parts may be made of metal and assembled with conventional threaded fasteners.

This invention has been described in its presently most preferred embodiment. It is clear that it is susceptible to numerous modifications, modes, and embodiments within the ability of those skilled in the art and without the exercise of the inventive faculty. Accordingly, the scope of this invention is defined by the scope of the following claims.

The invention claimed is:

1. A centering adaptor for spade type drill bits comprising:
a body having a longitudinal axis, said body having a tip end and a top end, an opening in said body intermediate said ends to receive a spade type drill bit, an opening on said axis of said body adjacent said top end to receive the shank of the spade type drill bit, a socket on the interior of said body adjacent said tip end configured to receive the tip of a spade type drill bit so that a spade type drill bit inserted into said body is positioned on said axis of said body; and
at least three arms movably mounted on said body adjacent said tip end thereof, said arms being configured and being interconnected so that they move radially with respect to said body to substantially the same radial distance.

2. The centering adaptor of claim 1 wherein said arms are pivoted in said body.

3. The centering adaptor of claim 2 wherein said structure urging said arms to pivot radially the same distance comprises an equalizing collar rotatably mounted on said body, said equalizing collar having structure engaging each of said arms to limit radial positioning of said arms to be the same as each of the other said arms.

4. The centering adaptor of claim 3 wherein said equalizing collar carries an equalizing lever for each of said arms, each of said equalizing levers engaging one of said arms to limit radial positioning of said arms.

5. The centering adaptor of claim 4 further including a rotational stop structure connected to said equalizing collar to limit rotation of said equalizing collar to limit radial outward positioning of said arms.

6. The centering adaptor of claim 1 wherein there is resilient structure in said body connected to said arms so that said arms are urged radially outward with respect to said body.

7. The centering adaptor of claim 6 wherein said resilient structure comprises a separate resilient structure connected to each of said arms to urge said arms in the radially outward direction.

8. The centering adaptor of claim 6 wherein said resilient structure comprises torsion bar structure.

9. The centering adaptor of claim 8 wherein said resilient structure comprises a torsion bar connected to each of said arms to urge said arms in the radially outward direction.

10. The centering adaptor of claim 8 wherein said torsion bar structure has a hook where it engages on said arm, said torsion bar being connected to said body to urge said arm in radially outward direction with respect to said body.

11. A centering adaptor for spade type drill bits comprising:
a body, said body having an axis, said body having a tip end and a top end, said axis extending through said ends, said top end having an opening therein sized to receive the shank of a spade type drill bit, the side of said body having an opening therein to receive the shank and spade of a spade type drill bit so that the spade type drill bit lies substantially on said axis of said body, a socket within said body on said axis to receive the spade type drill bit point to retain the axis of the spade type drill bit substantially on the axis of said body, said body being radially smaller than the spade on the spade type drill bit so that the spade of the spade type drill bit extends out of the sides of said body; and
structure on said tip end of said body to engage in a previously drilled hole and to center said axis of said body substantially on the axis of the previously drilled hole so that when the spade type drill bit is rotated and advanced into the previously drilled hole, the spade type drill bit is centered with respect to the hole and drills a larger hole coaxially therewith.

12. The centering adaptor of claim 11 wherein said centering structure comprises at least three radially movable arms, said at least three radially movable arms being interconnected so that they are each at a substantially equal radius from said axis of said body.

13. The centering adaptor of claim 12 wherein said radially movable arms are pivoted on said body and are resiliently urged in a radially outward direction.

14. The centering adaptor of claim 13 wherein there is a torsion bar connected to said arms, said torsion bar being also connected to said body to resiliently urge said arms in a radially outward direction with respect of said body.

15. The centering adaptor of claim 13 wherein said structure on said tip end of said body controls said arms to move into the same radial position and comprises an equalizing collar rotatably mounted on said body, said equalizing collar having an equalizing lever connected to each said arm so that rotation of said equalizing collar equalizes the radial positions of said arms.

16. The centering adaptor of claim 15 further including a cap engaged over said equalizing collar and retaining said equalizing levers on said equalizing collar, said cap being mounted on said equalizing collar to rotate therewith, said cap having a stop thereon and a stop pin mounted on said tip of said body to be engaged by said stop to limit radially outward motion of said arms.

17. The centering adaptor of claim 16 wherein said equalizing collar has posts thereon and said equalizing levers have loops rotatably engaging on said posts, said equalizing levers extending to engage in holes in said arms so that said cap engages over said posts and holds said equalizing levers in place on their respective posts.

18. The centering adaptor of claim 16 wherein said stop pin is removable so that said equalizing collar and equalizing levers can be removed for cleaning of said centering adaptor.

19. The centering adaptor of claim 11 wherein there is structure within said body adjacent said top end of said body which engages on the shank of the spade type drill bit to releasably retain the tip of the spade type drill bit in said socket.

20. The centering adaptor of claim 19 wherein said retaining structure comprises a lock plate having an opening therein sized to receive the shank of the spade type drill bit, said lock plate being pivoted in said body, and there is a deflected compression spring bearing against said lock plate urging said lock plate so that one end is urged toward the top of said body so that said opening in said lock plate locks around the shank.

* * * * *